US012087525B2

(12) United States Patent
Arrighetti et al.

(10) Patent No.: US 12,087,525 B2
(45) Date of Patent: Sep. 10, 2024

(54) LOW VOLTAGE SWITCH POLE

(71) Applicant: ABB S.p.A., Milan (IT)

(72) Inventors: Pierantonio Arrighetti, Bossico (IT); Michele Ceroni, Bedulita (IT)

(73) Assignee: ABB S.p.A., Milan (IT)

( * ) Notice: Subject to any disclaimer, the term of this patent is extended or adjusted under 35 U.S.C. 154(b) by 170 days.

(21) Appl. No.: 17/982,640

(22) Filed: Nov. 8, 2022

(65) Prior Publication Data

US 2023/0145656 A1 May 11, 2023

(30) Foreign Application Priority Data

Nov. 8, 2021 (EP) ..................................... 21206994

(51) Int. Cl.
*H01H 33/662* (2006.01)
*H01H 3/46* (2006.01)

(52) U.S. Cl.
CPC ........ *H01H 33/66207* (2013.01); *H01H 3/46* (2013.01)

(58) Field of Classification Search
CPC .......... H01H 9/36; H01H 9/443; H01H 73/18; H01H 9/342; H01H 9/46; H01H 50/54; H01H 50/546; H01H 9/34; H01H 9/302; H01H 9/362; H01H 50/14; H01H 9/52;
(Continued)

(56) References Cited

U.S. PATENT DOCUMENTS 4,958,135 A 9/1990 Baginski
5,899,323 A 5/1999 Rakus et al.
6,248,971 B1 6/2001 Morel
(Continued)

FOREIGN PATENT DOCUMENTS

EP 3048625 A1 7/2016
EP 3734631 A1 11/2020
(Continued)

OTHER PUBLICATIONS

Extended European Search Report for European Application No. 21206994.2, dated May 6, 2022, 5 pages.
(Continued)

*Primary Examiner* — Ahmed M Saeed
(74) *Attorney, Agent, or Firm* — McCarter & English, LLP

(57) ABSTRACT

Described herein is a switch pole for a low voltage switching device including an insulating casing defining an internal space with a contact area and an arc-extinguishing area of the switch pole, a fixed contact assembly and a movable contact assembly positioned in the contact area and including, respectively, one or more fixed contacts and one or more movable contacts, which can be mutually coupled or uncoupled, and an arc chamber positioned in the arc-extinguishing area that includes a plurality of parallel arc-breaking plates. The insulating casing includes an insulating wall partially separating the contact area from the arc-extinguishing area and a channel connects the contact area to the arc-extinguishing area. The switch pole further includes an additional arc-breaking element anchored to the insulating wall, passing through the channel of the insulating wall and arranged in electrical connection with a terminal arc-breaking plate of the arc chamber.

20 Claims, 12 Drawing Sheets

(58) Field of Classification Search
CPC ............. H01H 33/08; H01H 2009/365; H01H 73/045; H01H 9/345; H01H 33/10
See application file for complete search history.

(56) References Cited

U.S. PATENT DOCUMENTS

| | | | | |
|---|---|---|---|---|
| 10,211,003 | B1 * | 2/2019 | Fasano | H01H 33/596 |
| 2005/0151605 | A1 | 7/2005 | Kruschke | |
| 2009/0223934 | A1 * | 9/2009 | Tetik | H01H 9/362<br>218/151 |
| 2013/0021711 | A1 * | 1/2013 | Gao | H01H 9/342<br>218/46 |
| 2013/0264310 | A1 * | 10/2013 | Lang | H01H 9/346<br>218/2 |
| 2015/0062769 | A1 | 3/2015 | Cortes | |

FOREIGN PATENT DOCUMENTS

| | | | |
|---|---|---|---|
| JP | 2012221701 | A | 11/2012 |
| KR | 1020150040490 | A | 4/2015 |
| KR | 101733276 | B1 | 5/2017 |
| KR | 1020170108657 | A | 9/2017 |

OTHER PUBLICATIONS

European Search Report for European Application No. 15152348.7, dated Jul. 24, 2015, 3 pages.
International Search Report for International Application No. PCT/KR2018/013713, dated Feb. 15, 2019, 2 pages.

* cited by examiner

LOW VOLTAGE SWITCH POLE

CROSS-REFERENCE TO RELATED APPLICATION

This application claims priority to European Patent Application No. 21206994.2, filed Nov. 8, 2021, and titled "LOW VOLTAGE SWITCH POLE", which is hereby incorporated by reference in its entirety.

BACKGROUND

The present disclosure relates to a switch pole for a switching device to be used in low-voltage electrical systems. The present disclosure likewise relates to a switching device including one or more of said switch poles.

Low voltage switching devices, such as for example circuit breakers, disconnectors, contactors, or the like, include one or more switch poles, each including one or more fixed contacts and movable contacts that can be coupled to and uncoupled from one another.

Switching devices of the known art also include driving means designed to move the movable contacts relative to said fixed contacts, so that these electric contacts can be mutually couple or uncoupled, thereby allowing or preventing electric currents to flow along the switch poles. The driving means include, for instance, mechanisms, which terminate, for example, in a shaft operatively connected to said movable contacts.

As is known, during an opening maneuver of a switching device, electric arcs may arise between the electric contacts under separation of the switch poles, particularly under stress conditions (e.g., in presence of overload currents or short-circuit currents).

In order to break currents circulating along the switch poles, such arcing phenomena have to be extinguished as quickly as possible. To this aim, a switching device generally includes, for each switch pole, an arc chamber including a number of arc-breaking plates positioned near the electric contacts and designed to cool and split possible electric arcs raising between the electric contacts.

A problem normally present in switching devices of known type consists in that an uneven distribution of electric arcs among the arc-breaking plates of the arc chamber often occurs during opening maneuvers. As a result, the arc-quenching action exerted by the arc-breaking plates is not uniform and efficient.

Additionally, since electric arcs may bypass some arc-breaking plates, some parts of the arc chamber may be subject to higher concentrations of electrical and mechanical stresses and to higher temperatures. These events may adversely affect the lifetime of the arc chamber and lead to an early decay of its functionalities, thereby remarkably limiting the overall performances of the switching device.

Moreover, since they are not uniformly distributed among the arc-breaking plates of the arc chamber, electric arcs may sometimes "jump" towards other conductive parts of the switch pole, which are located outside the arc-extinguishing area of the switch pole. Obviously, possibly affected components may be subject to serious damages since they are not generally designed to bear high electric and thermal stresses.

The above-mentioned problems of the available solutions of the state of the art are even made more critical by the circumstance that, in modern electric power distribution grids, switching devices are often brought to operate to relatively high operating voltages (e.g., about 1-1.5 kV).

Electric arcs with higher energy content may therefore arise between the electric contacts under separation during opening maneuvers.

BRIEF DESCRIPTION

The present disclosure provides a switch pole for low voltage switching devices, which allows overcoming or mitigating the above-mentioned shortcomings.

In particular, the present disclosure provides a switch pole, in which a more uniform utilization of the arc breaking plates of the arc chamber is ensured.

The present disclosure also provides a switch pole, in which arcing phenomena towards parts outside the arc-extinguishing area of the switch pole are prevented or remarkably reduced.

The present disclosure further provides a switch pole that is reliable in operation and relatively easy and inexpensive to manufacture at industrial level.

The above aim and purposes, as well as other purposes that will emerge clearly from the following description and attached drawings, are provided, according to the present disclosure, by a switch pole for a low voltage switching device.

In a general definition, the switch pole, according to the present disclosure includes an insulating casing, which defines an internal space including a contact area and an arc-extinguishing area.

Said insulating casing includes an insulating wall partially separating said contact area from said arc-extinguishing area. The insulating wall is arranged in said internal space in an opposite position relative to said fixed contact assembly and extends from an outer wall of the insulating casing towards the fixed contact assembly.

The insulating wall includes a channel passing through said insulating wall and connecting said contact area to said arc-extinguishing area.

The switch pole, according to the present disclosure, further includes a fixed contact assembly and a movable contact assembly positioned in the contact area of the switch pole.

The fixed contact assembly and the movable contact assembly include, respectively, one or more fixed contacts and one or more movable contacts, which can be mutually coupled or uncoupled.

The fixed contact assembly may be arranged at a rear wall of the insulating casing.

The movable contact assembly of the switch pole may be reversibly movable between a first position, in which said movable contacts are coupled to said fixed contacts, and a second position, in which said movable contacts are spaced apart from said fixed contacts.

The switch pole, according to the present disclosure, further includes an arc chamber positioned in the arc-extinguishing area of the switch pole.

The arc chamber includes a plurality of conductive arc-breaking plates.

The arc chamber may include an insulating enclosure that can be removably fixed to the insulating casing of the switch pole. Advantageously, the arc-breaking plates of the arc chamber are fixed to said insulating enclosure.

The arc-breaking plates may be arranged at subsequent positions between a front wall and a rear wall of the insulating casing. The above-mentioned arc-breaking plates thus include a terminal arc-breaking plate arranged in distal position from the above-mentioned fixed contact assembly in comparison to the other arc-breaking plates of said arc chamber.

The terminal arc-breaking plate may be arranged at a front wall of the insulating casing, thereby in an opposite position with respect to the fixed contact assembly of the switch pole.

The terminal arc-breaking plate may be arranged in proximal position to the contact area of the switch pole, in comparison to the other arc-breaking plates of said arc chamber.

According to the present disclosure, the switch pole includes an additional arc-breaking element anchored to the insulating wall of the switch pole and partially inserted in the channel of said insulating wall.

The additional arc-breaking element is at least partially exposed to the contact area and is in electrical connection with the terminal arc-breaking plate of the arc chamber.

According to embodiments of the present disclosure, the additional arc-breaking element includes a first plate portion, which is inserted in said channel and extends along said insulating wall, and a second plate portion, which passes through said channel and protrudes from said insulating wall, extending across said arc-extinguishing area.

The first and second plate portions of the additional arc-extinguishing element may be mutually joined and arranged transversally (or perpendicularly) one to another.

Said first plate portion may include a terminal edge exposed to said contact area.

Said first plate portion may include an opening to favor the passage of hot gases through said channel.

Said first plate portion may include a protruding tab oriented towards the contact area and exposed to said contact area.

Said first plate portion may include a pair of side protrusions fitting to corresponding anchoring surfaces of said channel.

Said second plate portion may include a folded end coupled to the terminal arc-breaking element, so as to be in electric contact with this latter.

The folded end of said second plate portion may have a reversed-U profile.

BRIEF DESCRIPTION OF THE DRAWINGS

Further features and advantages of the present disclosure will be evident from the description of embodiments of a switch pole, according to the present disclosure, shown by way of examples in the accompanying drawings.

DETAILED DESCRIPTION

Figure 1:
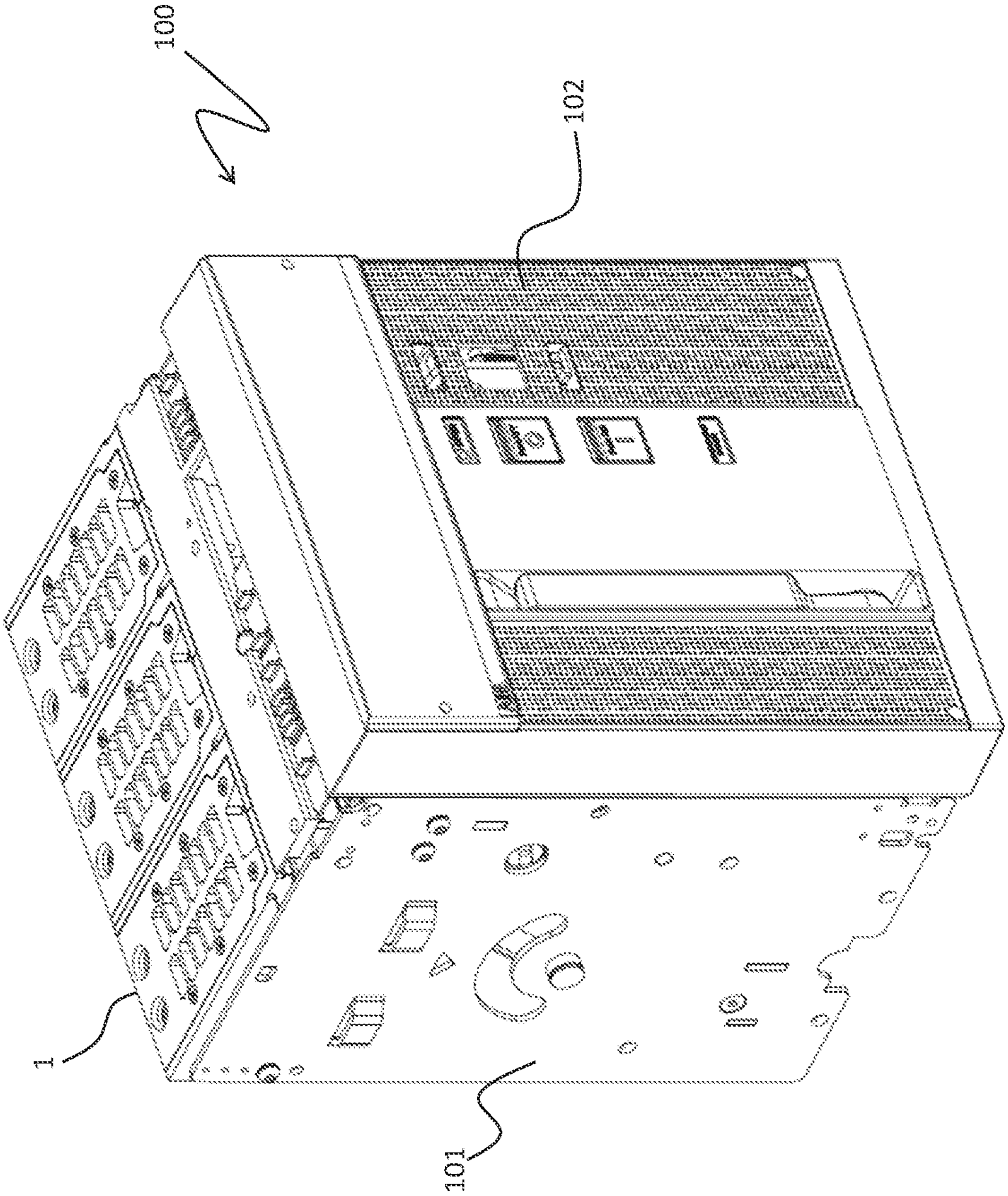
FIG. 1 is a perspective view of a low voltage switching device including a low voltage switch pole according to the present disclosure.

With reference to the attached figures, the present disclosure relates to a switch pole 1 for a low voltage switching device 100, e.g., a circuit breaker, a disconnector, a contactor, or the like.

The switching device 100 is particularly adapted for use in AC low voltage electrical systems and it will be described with particular reference to these applications. However, in principle, it may be used also in electric systems of different type, e.g., in DC low voltage electrical systems.

For the purposes of the present disclosure, the term "low voltage" relates to operating voltages up to 1.5 kV AC and 2 kV DC.

The switching device 100 includes one or more switch poles 1, according to the present disclosure.

The number of switch poles may vary, according to the needs. In the embodiments shown in the cited figures, the switching device 100 is of the three-phase type and it includes three switch poles. However, according to other embodiments of the present disclosure (not shown), the switching device 100 may include a different number of switch poles depending on the number of electric phases of the electric circuit, in which it has to be installed.

Each switch pole 1 of the switching device 100 includes an insulating casing 2, which defines an internal space including a contact area 3 and an arc-extinguishing area 4.

In general, the contact area 3 is an area of the switch pole where the contact assemblies of the switch pole are arranged and operated. On the other hand, the arc-extinguishing area 4 is an area of the switch pole where there are arranged arc-quenching means designed to extinguish possible electric arcs arising between the electric contacts of the switch pole, during the opening maneuvers of the switching device 100.

As shown in the cited figures, the contact area 3 and the arc-extinguishing area 4 of the switch pole 1 are adjacent and communicate one to another, such that a gas can flow between these internal areas.

The arc-extinguishing area 4 may be positioned at un upper level with respect to the contact area 3, i.e., in proximal position relative to a top side of this latter.

Figure 2:
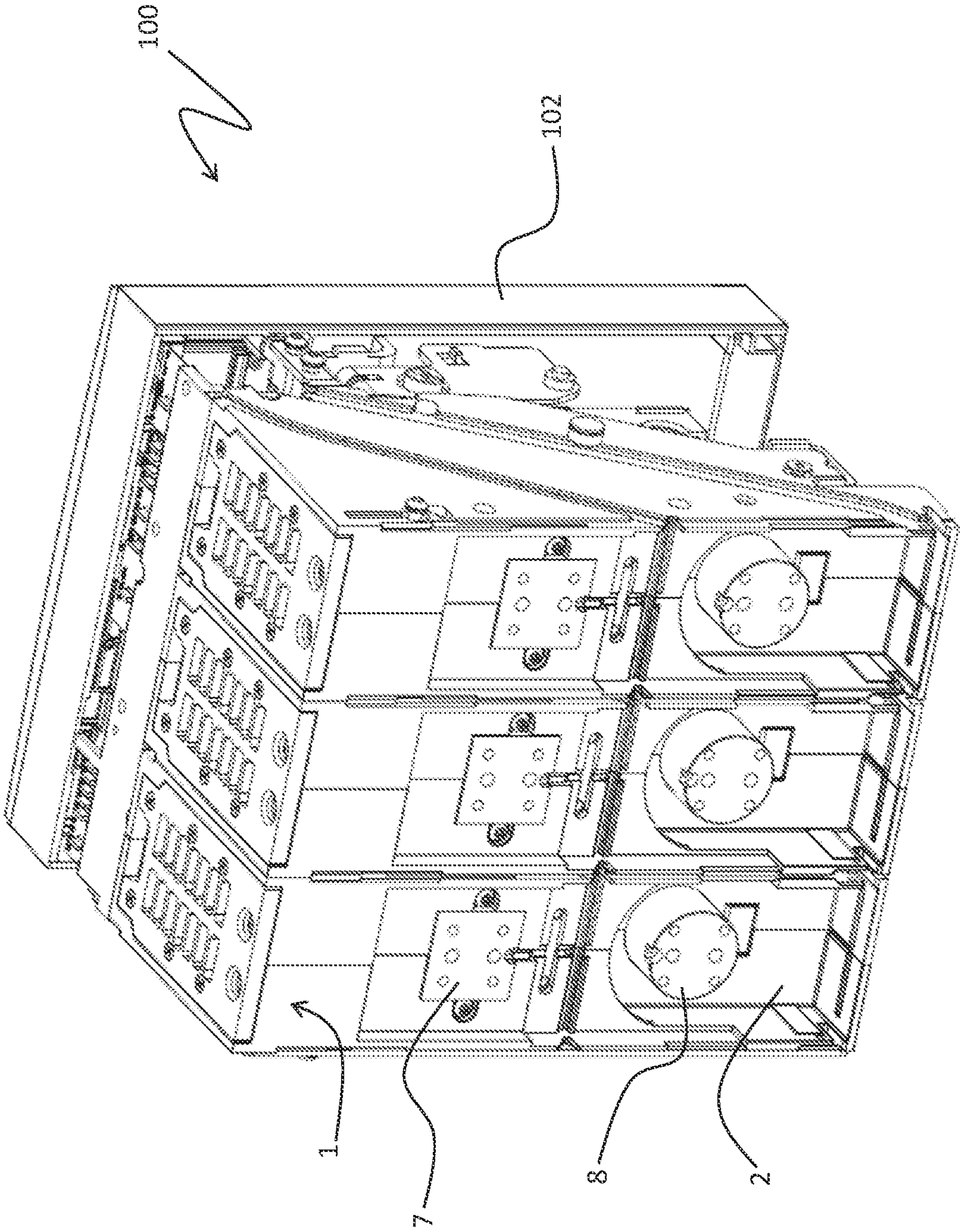
FIG. 2 is a perspective view showing the switch poles of the switching device of FIG. 1.
Figure 3:
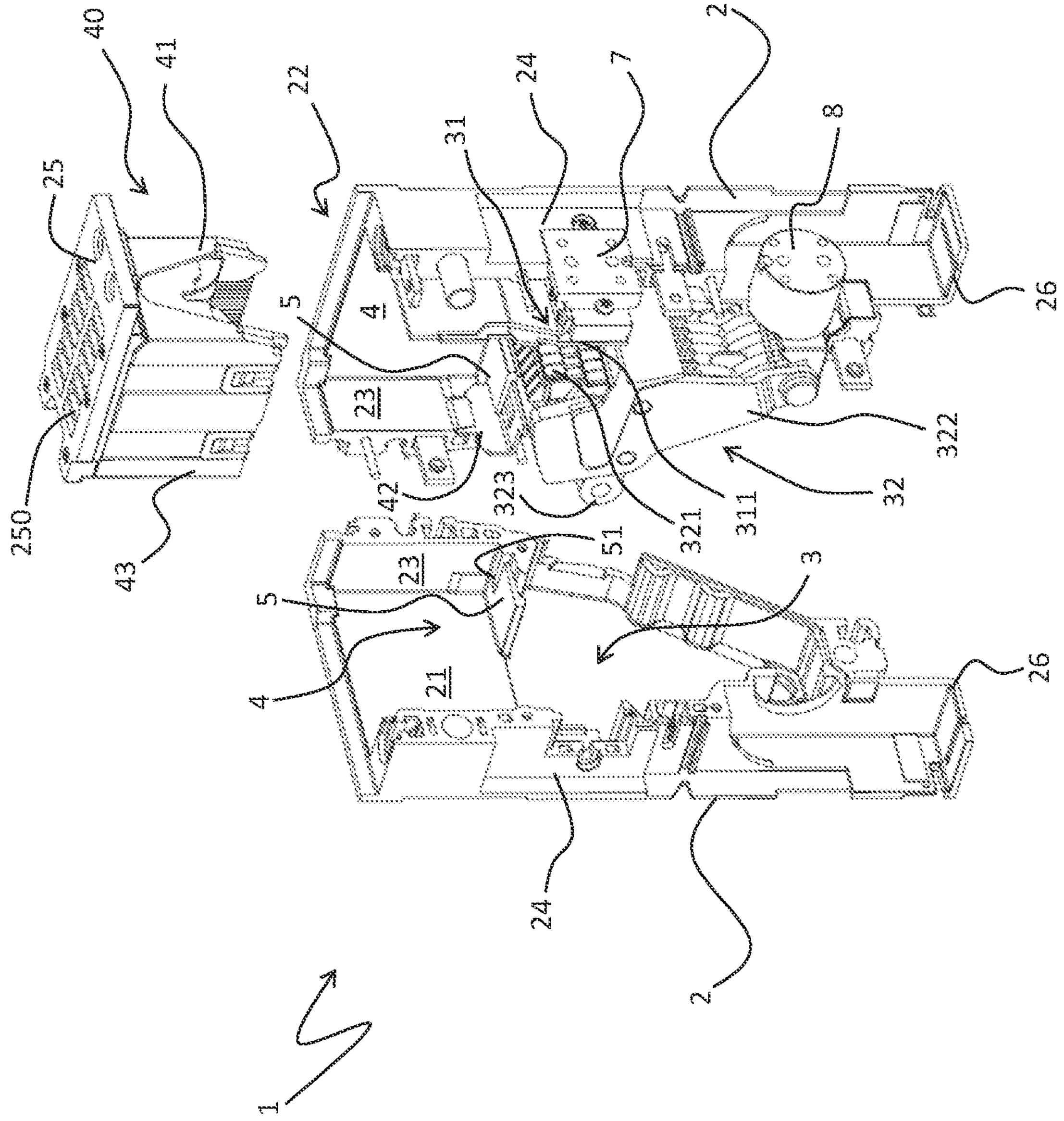
FIG. 3 is an exploded view of an embodiment of a switch pole, according to the present disclosure.
Figure 4:
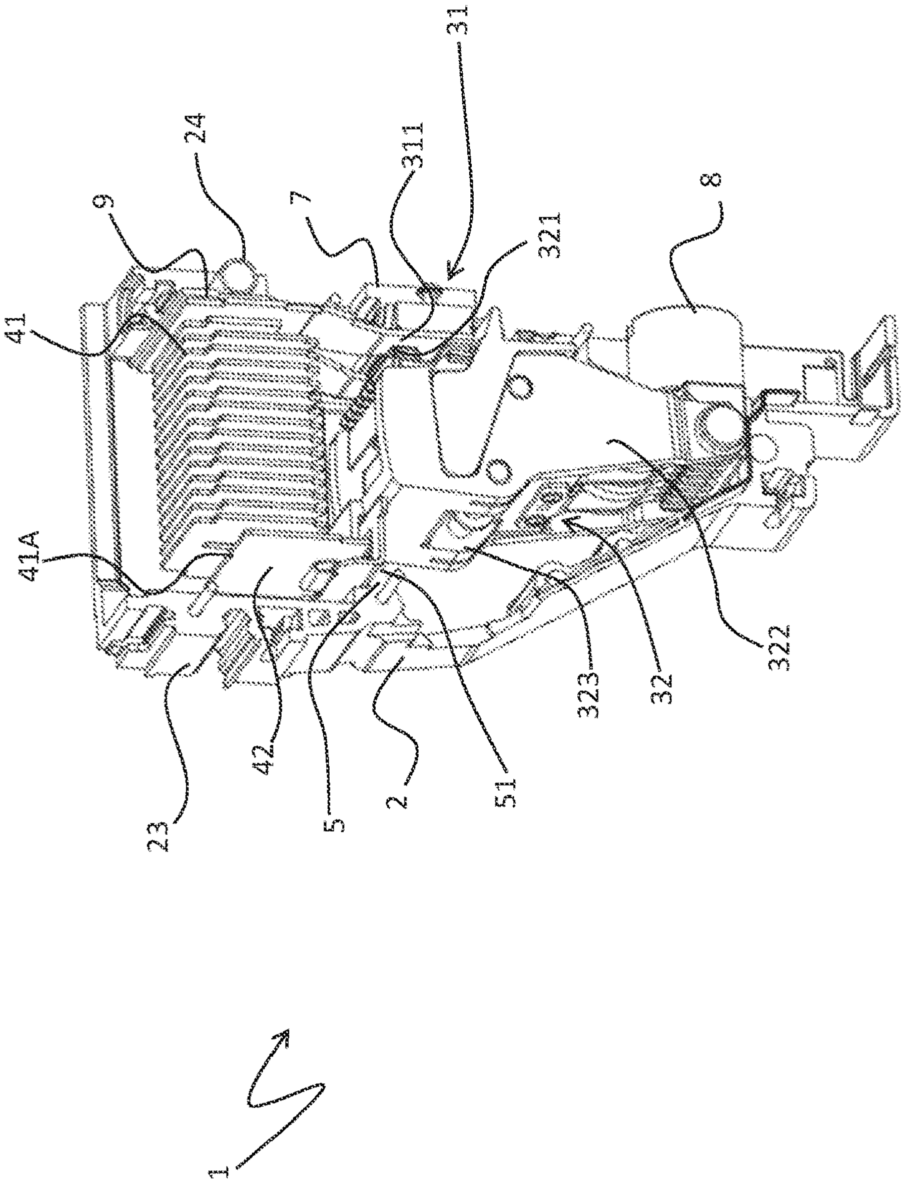
FIGS. 4-6 and 6A are different views of the switch pole, according to the present disclosure.
Figure 5:
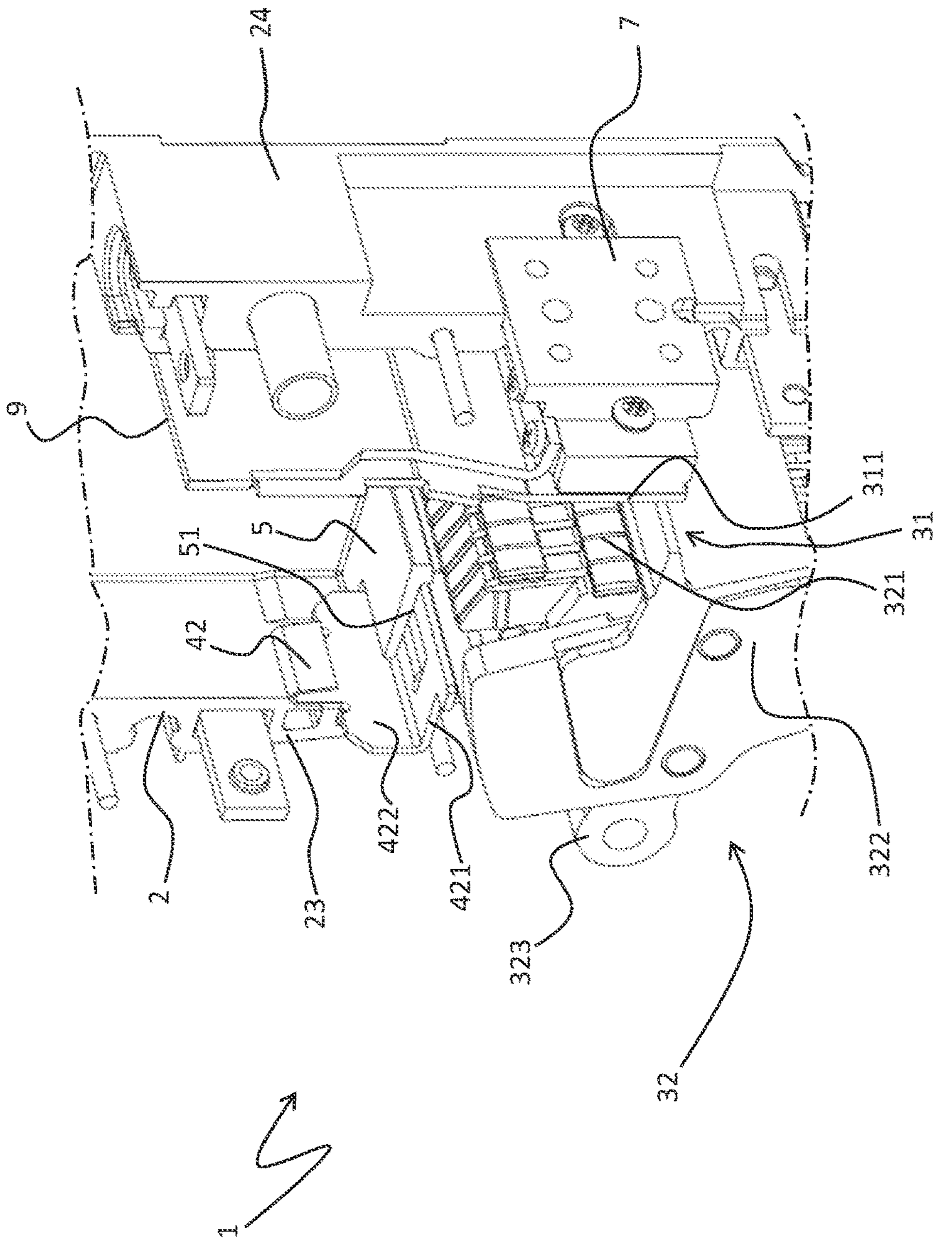

For the sake of clarity, it is specified that relative terms used in this disclosure, e.g. "front", "rear", "lateral", "upper", "lower", "top" and "bottom", relate to the switch pole 1 in its normal installation conditions, namely in the "vertical" installation shown in FIGS. 1-2. The insulating casing 2 of the switch pole is shaped as a contoured box, with opposite first and second side walls 21, 22, opposite front and rear walls 23, 24 and opposite top and bottom walls 25, 26.

As shown in the attached figures, the insulating casing 2 may include first and second half shells coupled to each other so as to form said insulating casing. In practice, a first half shell includes the first side wall 21, a portion of the front wall 23, a portion of the rear wall 24 and a portion of the bottom wall 26, while a second half shell includes the second side wall 22, a portion of the front wall 23, a portion of the rear wall 24 and a portion of the bottom wall 26.

According to these embodiments of the present disclosure, the top wall 25 of the insulating casing 2 is fixed to an insulating enclosure 43 of another component 40 (the arc chamber) of the switch pole and it may be removably installed in the switch pole together with such a component.

However, according to other embodiments of the present disclosure (not shown), the insulating casing 2 of the switch pole may be arranged differently. For example, the top wall 25 of the insulating casing 2 may be integral with other walls of the insulating casing or it may be self-standing so as to be removably couplable with other walls of the insulating casing.

The top wall 25 of the insulating casing 2 may be provided with a number of through openings 250 to allow the exit of hot gases from the internal volume of the switch pole, in particular from the arc-extinguishing area 4.

The insulating casing 2 is made of an electrically insulating material, e.g., a thermosetting or a thermoplastic material.

The switch pole 1 includes a fixed contact assembly 31 and a movable contact assembly 32, which are positioned in the contact area 3 of the switch pole.

The fixed contact assembly 31 includes one or more fixed contacts 311, which may be formed by suitable conductive tips or plates.

In the embodiments shown in the cited figures, the fixed contact assembly 31 includes a pair of fixed contacts 311, which may be positioned at the rear wall 24 of the insulating casing 2 of the switch pole. However, according to other embodiments of the present disclosure (not shown), the fixed contact assembly 31 may include a different number of electric contacts.

In general, the fixed contact assembly 31 may be realized according to solutions of known type and it will be described hereinafter only with reference to the aspects of interest of the present disclosure, for the sake of brevity.

The movable contact assembly 32 includes one or more movable contacts 321, which may be formed by suitable conductive fingers provided with suitable contact tips.

Figure 10:
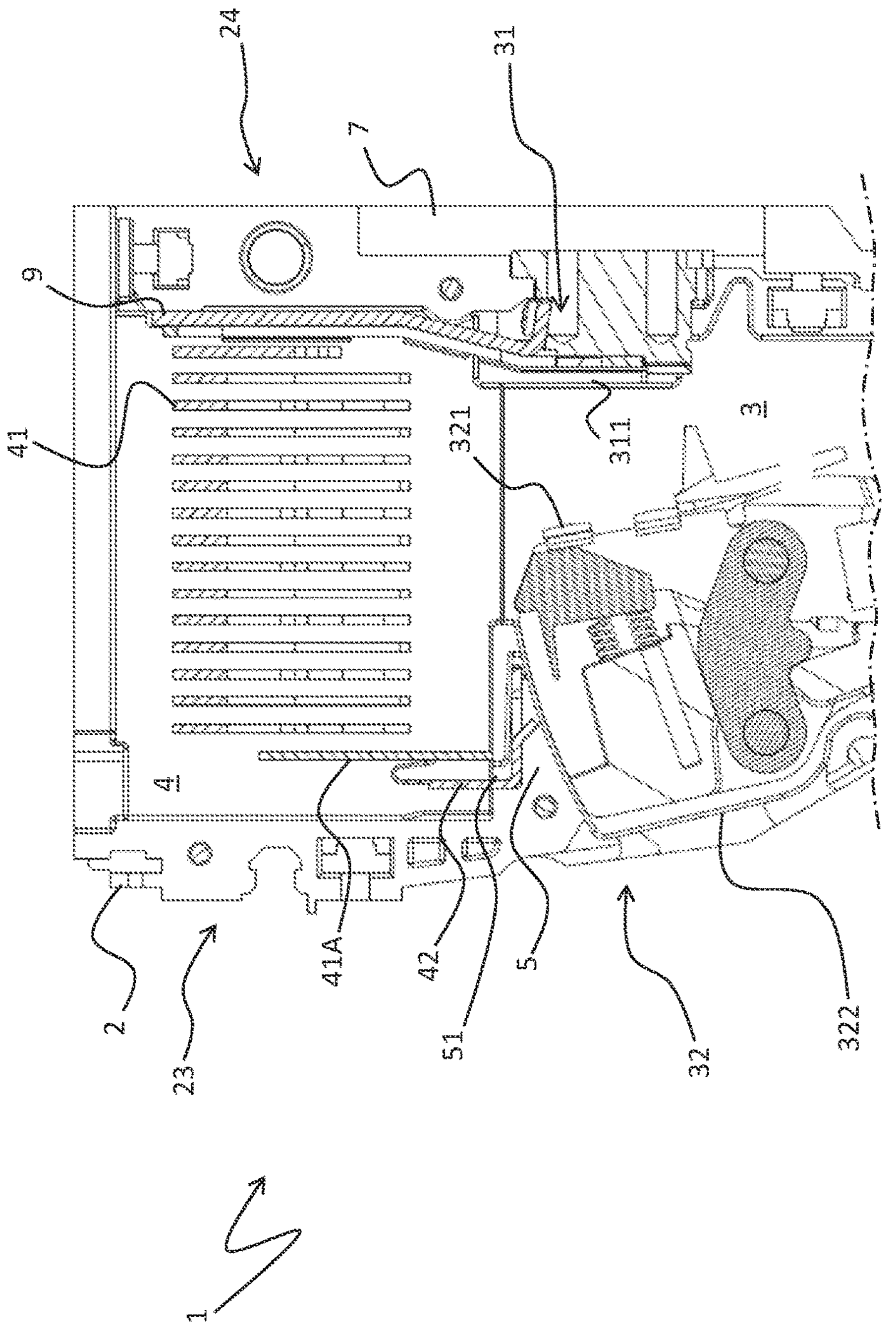

The movable contacts 321 can be mutually coupled or uncoupled to the fixed contacts 311. To this aim, the movable contact assembly 32 is reversibly movable between a first position (FIG. 7), in which the movable contacts 321 are coupled to the fixed contacts 311, and second position (FIG. 10), in which the movable contacts 321 are fully spaced apart from the fixed contacts 311.

The first position of the movable contacts 321 corresponds to a closed condition of the switching device 100, in which electric currents are allowed to flow along the electric poles whereas the second position of the movable contacts 321 corresponds to an open condition of the switching device 100, in which electric currents along the electric poles are interrupted.

A transition of the movable contacts 321 of each electric pole from the above-mentioned first position to the above-mentioned second position constitute an opening maneuver of the switching device 100 whereas an opposite transition of the movable contacts 321 of each electric pole from the above-mentioned second position to the above-mentioned first position constitute a closing maneuver of the switching device 100.

In the embodiments shown in the cited figures, the movable contact assembly 32 includes a pair of movable contacts 321. However, according to other embodiments of the present disclosure (not shown), the movable contact assembly 32 may include a different number of electric contacts.

The movable contact assembly 32 may include a supporting structure 322 for supporting the electric contacts 321, which conveniently rotates about a suitable rotation axis, so as to allow engagement/disengagement of the movable contacts 321 to or from the fixed contacts 311 of the fixed contact assembly 31.

The supporting structure 322 conveniently includes a connecting element 323, which protrudes outside the insulating casing 2 of the switch pole (the connecting element 323 may protrude from a suitable window in the front wall 23) for connection with a driving mechanism (not shown) designed to move the movable contact assembly 32 of each switch pole 1.

In general, the movable contact assembly 32 may be realized according to solutions of known type and it will be described hereinafter only with reference to the aspects of interest of the present disclosure, for the sake of brevity.

Each switch pole 1 may include a first pole terminal 7 and a second pole terminal 8 that are electrically coupled with the fixed contacts 311 and the movable contacts 321 of the fixed contact assembly 31 and the movable contact assembly 32, respectively.

In operation, the pole terminals 7, 8 are electrically coupled with corresponding line conductors of an electric line. Such line conductors are, in turn, electrically connected to an electric power source (e.g., an electric power feeding or generation system or a section of electric grid) and to an electric load (e.g., an electric system or apparatus or a section of electric grid).

The pole terminals 7, 8 may be positioned at the rear wall 24 of the insulating casing 2 of the switch pole 1.

In general, the pole terminals 7, 8 may be realized according to solutions of known type and it will be described hereinafter only with reference to the aspects of interest of the present disclosure, for the sake of brevity.

According to some embodiments of the present disclosure (shown in the cited figures), the switch pole 1 includes an elongated conductive plate 9 (e.g., formed by a metal plate), which is electrically connected to the fixed contacts 311 of the fixed contact assembly 31.

The conductive plate 9 may extend from the fixed contacts 311 towards the arc-extinguishing area 4 and it may be arranged at the rear wall 24 of the insulating casing 2, thereby extending between the contact area 3 and the arc-extinguishing area 4.

According to the present disclosure, the switch pole 1 includes an arc chamber 40 positioned in the arc-extinguishing area 4 of the switch pole, conveniently above the contact area 3.

The arc chamber 40 may include a plurality of arc-breaking plates 41, 41A designed to extinguish possible electric arcs raising between the electric contacts 311, 312 when these latter are separated during an opening maneuver of the switching device 100.

In the embodiments shown in the cited figures, the arc chamber 40 may be formed by a self-standing structure that can be removably installed in the corresponding switch pole 1. In this case, the arc chamber 40 may include an insulating enclosure 43 (made of an electrically insulating material, e.g., a thermosetting or thermoplastic material), which can be removably fixed to the insulating casing 2 of the switch pole. The arc-breaking plates 41, 41A are conveniently fixed to the insulating enclosure 43.

The top wall 25 of the insulating casing 2 may be fixed to the insulating enclosure 43 of the arc chamber 40. In this way, it can be installed or removed together with the arc chamber 40.

In the following, the arc chamber 40 will be described with reference to the above-illustrated embodiments of the present disclosure for the sake of brevity only. Indeed, according to other embodiments of the present disclosure (not shown), the arc chamber 40 may be simply formed by a region of the arc-extinguishing area 4 of the switch pole, in which the arc-breaking plates 41, 41A are arranged, for example by fixing them to the insulating casing 2 through suitable supports.

The arc-breaking plates 41, 41A of the arc chamber 40 are conveniently arranged in parallel one to another, and may be arranged along reference planes parallel to the front and rear walls 23, 24 of the insulating casing 2.

The arc-breaking plates 41, 41A may be arranged at subsequent positions between the front and rear walls 23, 24 of the insulating casing 2, in particular at increasing distances from the fixed contact assembly 31. The above-mentioned arc-breaking plates thus include a terminal arc-breaking plate 41A arranged in distal position from the above-mentioned fixed contact assembly 31 in comparison to the other arc-breaking plates 41 of the arc chamber.

The terminal arc-breaking plate 41A may be arranged at the front wall 23 of the insulating casing 2, thereby in an opposite position with respect to the rear wall 24, where the fixed contact assembly 31 is arranged.

The terminal arc-breaking plate 41A may be arranged in proximal position to the contact area 3 compared to the other arc-breaking plates 41 of the arc chamber, thereby being in proximity of the contact area 3.

In general, as it is evident from the cited figures, the terminal arc-breaking plate 41A delimits the arc chamber 40 at the front wall 23 of the insulating casing 2.

The other arc-breaking plates 41 of the arc chamber may be arranged at a given distance from the contact area 3, so that there is a gap region of the arc-extinguishing area 4, which separates the contact area 3 and these arc-breaking plates 41.

The other arc-breaking plates 41 of the arc chamber may be arranged at different distances from the contact area 3. For example, as shown in the cited figures, the arc-breaking plates 41 having a lower edge at a first distance from the contact area 3 may be alternated with arc-breaking plates 41 having a lower edge at a second distance from the contact area 3, wherein said second distance is shorter than said first distance.

The terminal arc-breaking plate 41, 41A may be formed by contoured plates made of metal or other conductive material.

According to the present disclosure, the insulating casing 2 includes an insulating wall 5 partially separating the contact area 3 from the arc-extinguishing area 4.

The insulating wall 5 is arranged in an opposite position with respect to the fixed contact assembly 31 and it extends across the internal space of the switch pole from an outer wall (which may be the front wall 23) of the insulating casing 2 towards the fixed contact assembly 31.

The insulating wall 5 may have a terminal edge in correspondence of a middle portion of the contact area 3.

Conveniently, the insulating wall 5 defines the boundary between the contact area 3 and the arc-extinguishing area 4, which may be at the front wall 23 of the insulating casing 2. In this way, the contact area 3 and the arc-extinguishing area 4 are in direct communication with each other in the region near the fixed contact assembly 31 (i.e., at the rear wall 24 of the insulating casing 2). Conversely, in the region near the front wall 23 of the insulating casing 2 (i.e., opposite to the fixed contact assembly 31), the contact area 3 and the arc-extinguishing area 4 are isolated from each other by the insulating wall 5. In this way, possible "jumps" of the electric arcs towards other conductive parts of the switch pole, which are located outside the arc-extinguishing area 4, are greatly reduced.

As shown in the embodiments of the cited figures, the insulating wall 5 may be integral with the front wall 23 and the opposite side walls 21, 22 of the insulating casing 2 and it may extend from the front wall 23 towards the fixed contact assembly 31 and the rear wall 24.

The insulating wall 5 includes a channel 51 passing therethrough (i.e., through its full thickness), which connects the contact area 3 to the arc-extinguishing area 4, in such a way that a gas can flow between these areas of the switch pole. In practice, the channel 51 forms a further fluid connection between the contact area 3 and the arc-extinguishing area 4.

The channel 51 is designed to convey hot gases generated during an opening maneuver of the switching device from the contact area 3 towards a terminal portion of the arc chamber 40, in proximity of the front wall 23 of the insulating casing 2. In this way, the insulating wall 5 does not obstruct the flow of hot gases away from the contact area 3, which improves the fluid-dynamics of hot gases through the internal space of the switch pole.

Figure 6:
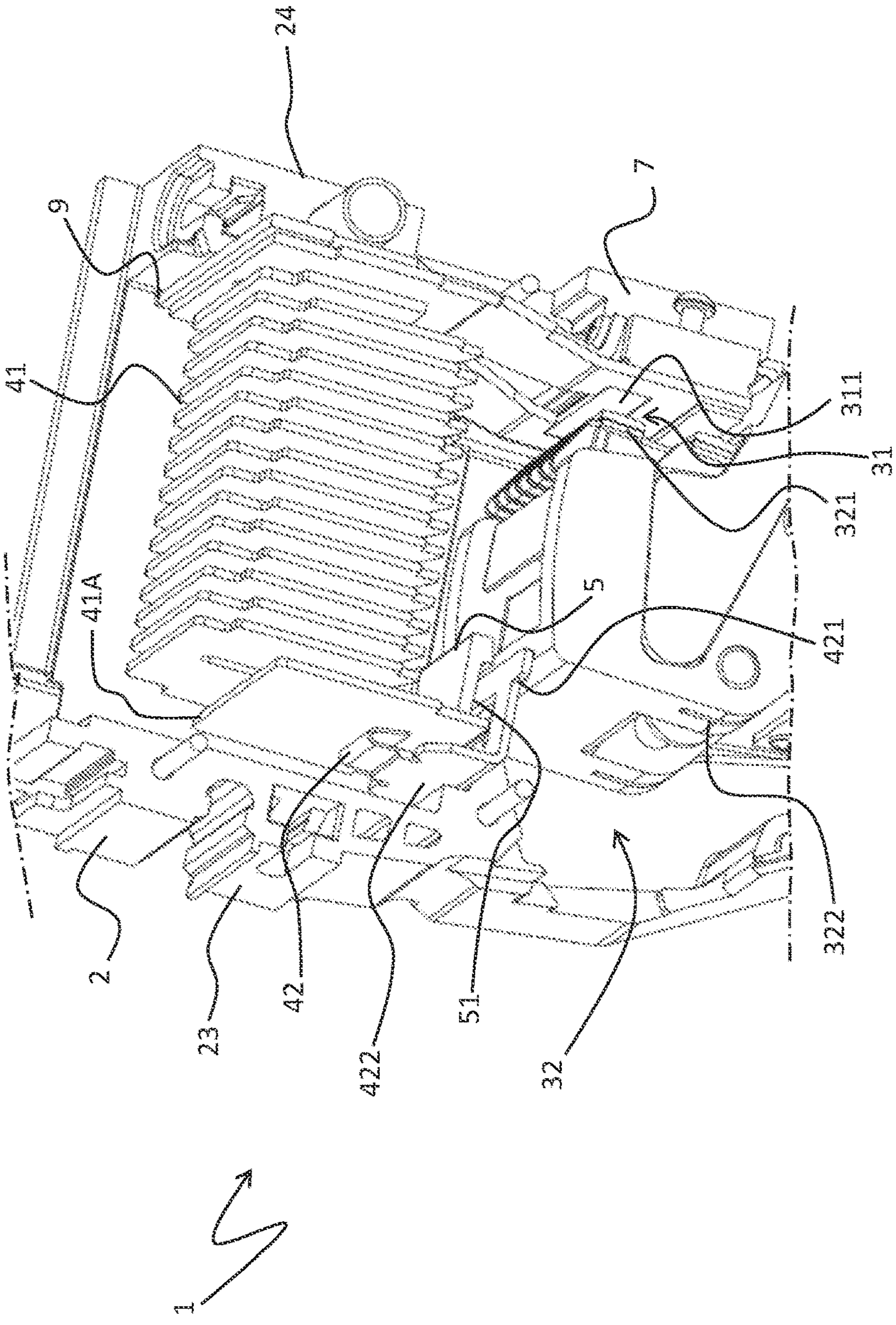
Figure 6A:
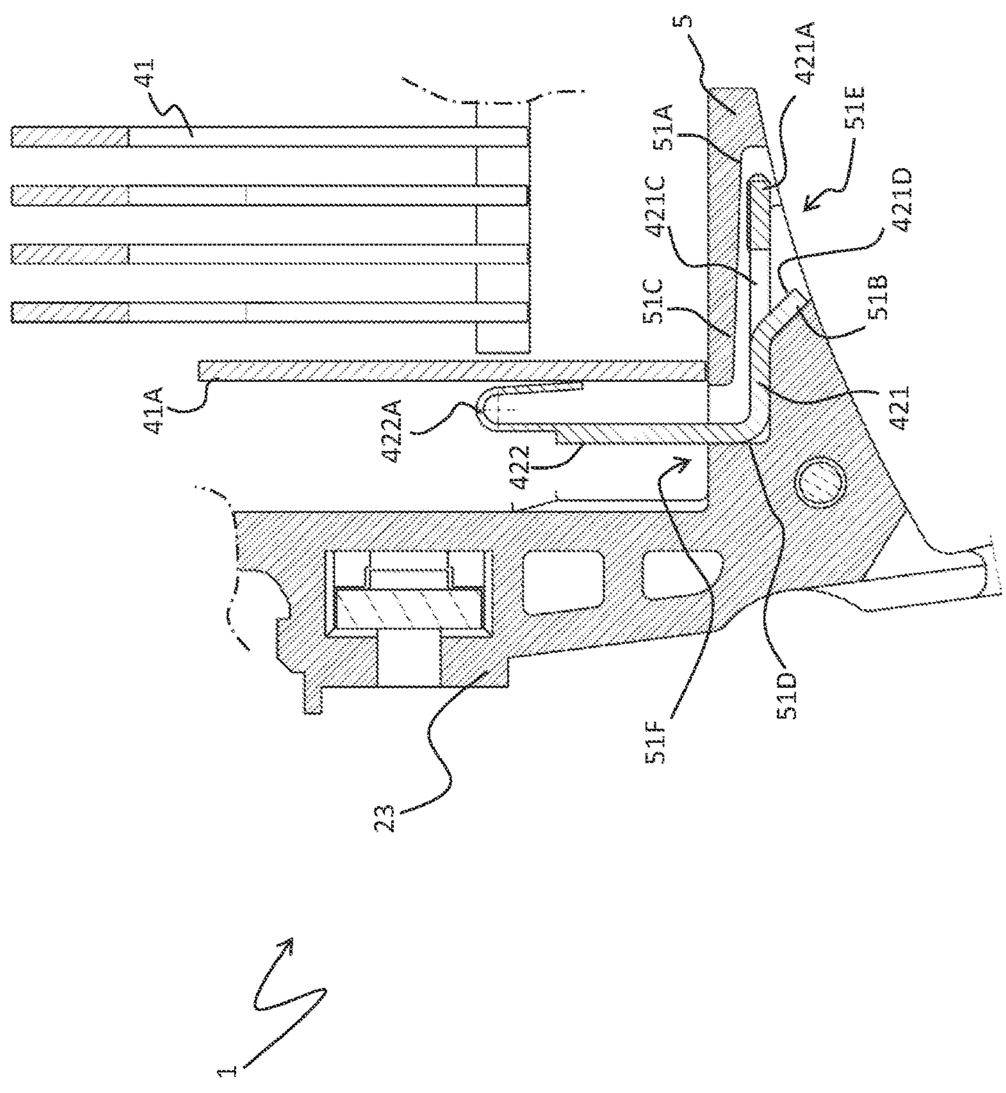

The channel 51 may have a first inlet 51E, which may have an enlarged shape, in communication with the contact area 3 and a second inlet 51F, which may have a slotted shape, in communication with the arc-extinguishing area 4 (FIG. 6A).

The channel 51 may include a first section 51C, which extends along the insulating wall 5 and communicates with the contact area 3 through the first inlet 51E, and a second section 51D, which extends transversally to the insulating wall 5 and communicates with the arc-extinguishing area through the second inlet 51F (FIG. 6A).

The channel 51 may have substantially a reversed-L profile, as shown in FIG. 6A, with the first longitudinal section 51C much longer that the second transversal section 51D.

According to the present disclosure, the switch pole 1 includes an additional arc-breaking element 42, which is anchored to the insulating wall 5 and partially inserted in the channel 51 of this latter. The additional arc-breaking element 42 is exposed, at least partially, to the contact area 3 and, at the same time, in electrical connection with the terminal arc-breaking plate 41A of the arc chamber 40.

The arrangement of an additional arc-breaking element 42, as defined in the present disclosure, provides relevant advantages.

During an opening maneuver of the switching device, the additional arc-breaking element 42 catches and drives possible electric arcs formed between the electric contacts under separation towards a terminal portion of the arc chamber, where the terminal arc-breaking plate 41A of the arc chamber 40 is located.

Electric arcs are thus urged to pass through the terminal arc-breaking plate 41A, thereby developing throughout the whole arc chamber and involving all the arc-breaking plates 41 of this latter.

The path followed by the electric arcs raising during an opening maneuver of the switching device is thus remarkably lengthened, which greatly favors the cooling of said electric arcs.

On the other hand, the presence of a channel 51 in the insulating wall 5 of the switch pole improves the fluid dynamics inside the switch pole by making hot gases (generated by high energy ionization effects of air filling the switch pole) flow away from the contact area 3 of the switch pole. The hot gases may flow towards a front wall 23 and a top wall 25 of the insulating casing 2.

Such a movement of the hot gas contributes to stripping the electric arcs throughout the arc chamber 40 in such a way to move them away from the contact area 3 and involve the arc-breaking plates 41A, 41 of the arc chamber.

According to embodiments of the present disclosure, the additional arc-breaking element 42 includes a first plate portion 421 and a second plate portion 422, which are mutually joined and arranged transversally one to another.

The additional arc-breaking element 42 may have the first and second plate portions 421, 422 arranged perpendicularly one to another. In some embodiments, the additional arc-breaking element 42 has a L-shaped profile.

The additional arc-breaking element 42 may be formed by a folded plate made of metal or other conductive material.

Figure 12:
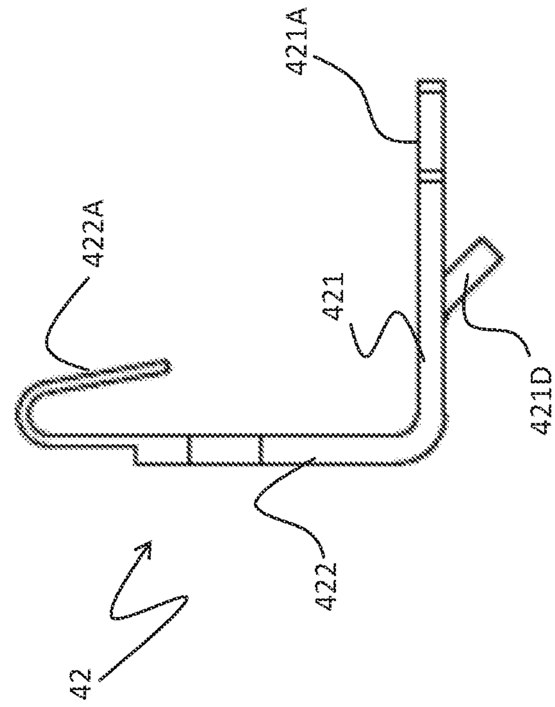
FIGS. 11 and 12 are perspective views of an additional arc-breaking element of the switch pole, according to the present disclosure.
Figure 11:
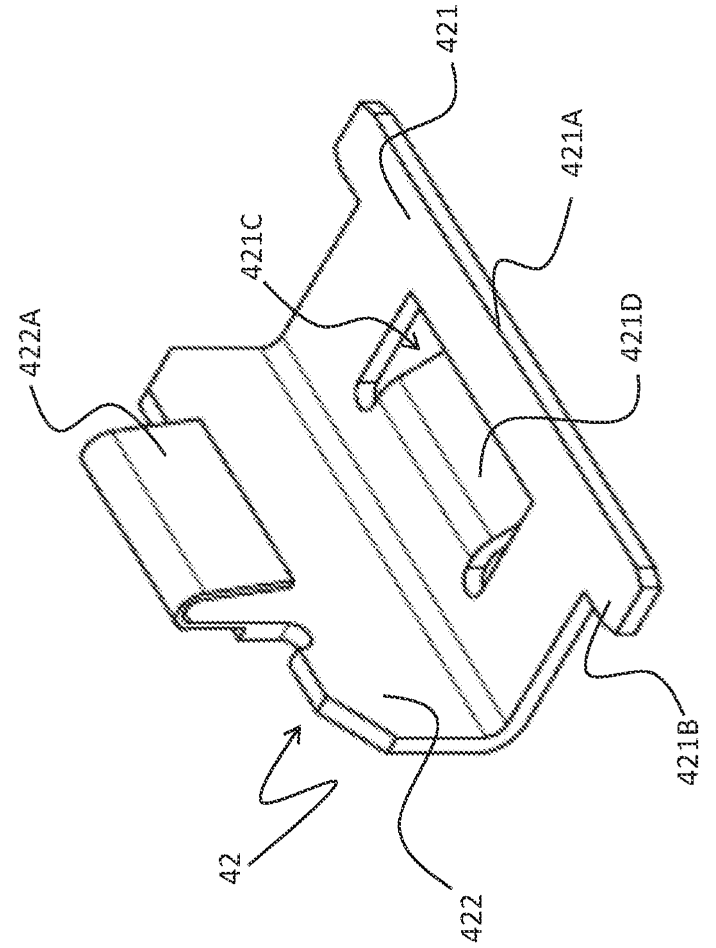

In operation, the first plate portion 421 of the arc-breaking element 42 is inserted in the channel 51 of the insulating wall 5, namely along the first longitudinal section 51C of said channel. In this way, the first plate portion 421 extends along the insulating wall 5 by following the path of the first longitudinal section 51C of the channel 51 (FIGS. 6A and 11-12).

The first plate portion 421 may have a terminal edge 421A, which is directly exposed to the contact area 3 of the switch pole. Conveniently, the terminal edge 421A leans on a first surface 51A of the channel 51, which defines the first inlet 51E, thereby facing the contact area 3 (FIGS. 6A and 11-12).

The first plate portion 421 may include an opening 421C passing therethrough in order to favor the passage of hot gases through the channel 51. Conveniently, the opening 421C is located at the first inlet 51E of the channel 51. In this way, the plate portion 421 allows the flow of hot gases through the channel 51, during an opening maneuver of the switching device (FIGS. 6A and 11-12).

The first plate portion 421 may include a protruding tab 421D protruding transversally with respect to a main extension plane of said first plate portion. In operation, the protruding tab 421D is oriented towards the contact area 3 of the switch pole and directly exposed to this latter.

Conveniently, the protruding tab 421D leans on a second surface 51B of the channel 51 (opposite to said first surface 51A), which defines the first inlet 51E, thereby facing the contact area 3 (FIGS. 6A and 11-12).

The first plate portion 421 may include a pair of side protrusions 421B fitting to corresponding anchoring surfaces (not shown) of the channel 51, when the first plate portion 421 is inserted in the channel 51. In this way, the first plate portion 421 (and consequently the arc-breaking element 42) is anchored to the insulating wall 5.

As mentioned above, the second plate portion 422 is joined to the first plate portion 421.

The second plate portion passes through the channel 51 (namely through the second section 51D of this latter) and protrudes from the insulating wall 5, extending across the arc-extinguishing area 4, and may extend in parallel to the arc-breaking plates 41, 41A of the arc chamber 40.

The second plate portion 422 may have a folded end 422A, which is arranged in distal position from the first plate portion 421. The folded end 422A is coupled to the terminal arc-breaking plate 41A in such a way to be in electric contact with this latter.

The folded end 422A of the first plate portion 421 may have a reversed-U profile.

FIGS. 7-10 show the behavior of the switch pole 1 during an opening maneuver of the switching device 100.

Figure 7:
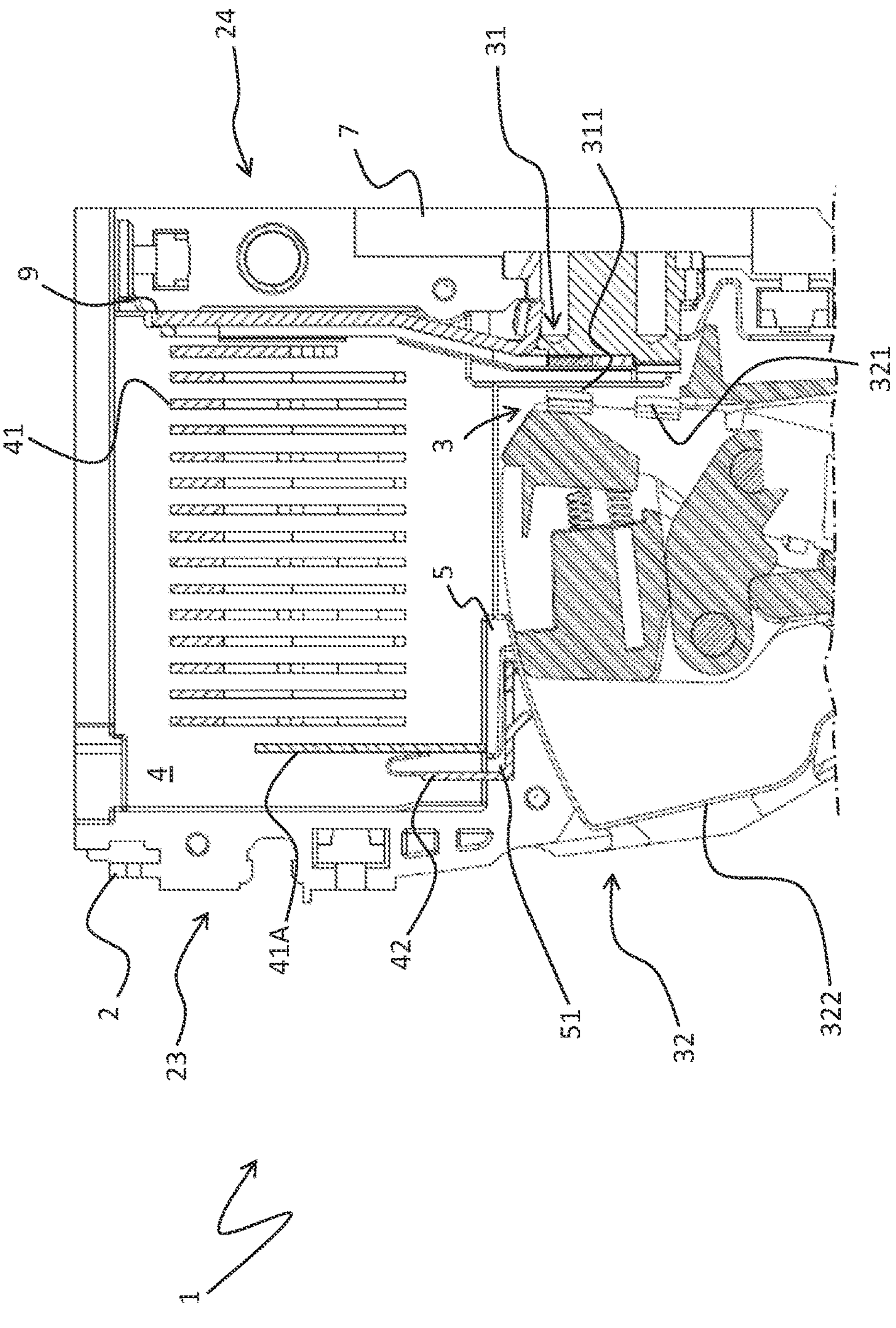
FIGS. 7-10 are other views the switch pole, according to the present disclosure, in different operating conditions.

FIG. 7 shows the switch pole with the movable contacts 321 coupled to the fixed contacts 311 (closed condition of the switching device). In this situation, a current can flow along the switch pole between the pole terminals 7, 8 and no electric arcs develop between the electric contacts 311, 321.

During an opening maneuver, the movable contacts 321 are moved away from the fixed contacts 311.

As soon as the movable contacts 321 separate from the fixed contacts 311 (FIG. 8), a difference of voltage potential is established between said electric contacts 311, 321 (at any time, movable contacts 321 may have a positive voltage polarity while fixed contacts 311 have a negative voltage polarity, or vice-versa). Since the dielectric distance between the electric contacts 311, 321 is quite short, electric arcs initially develop between said electric contacts and in an initial part of the arc chamber, located in proximity of the fixed contact assembly 31 (the path of the electric arcs is schematically represented by the dotted arrow of FIG. 8).

Figure 8:
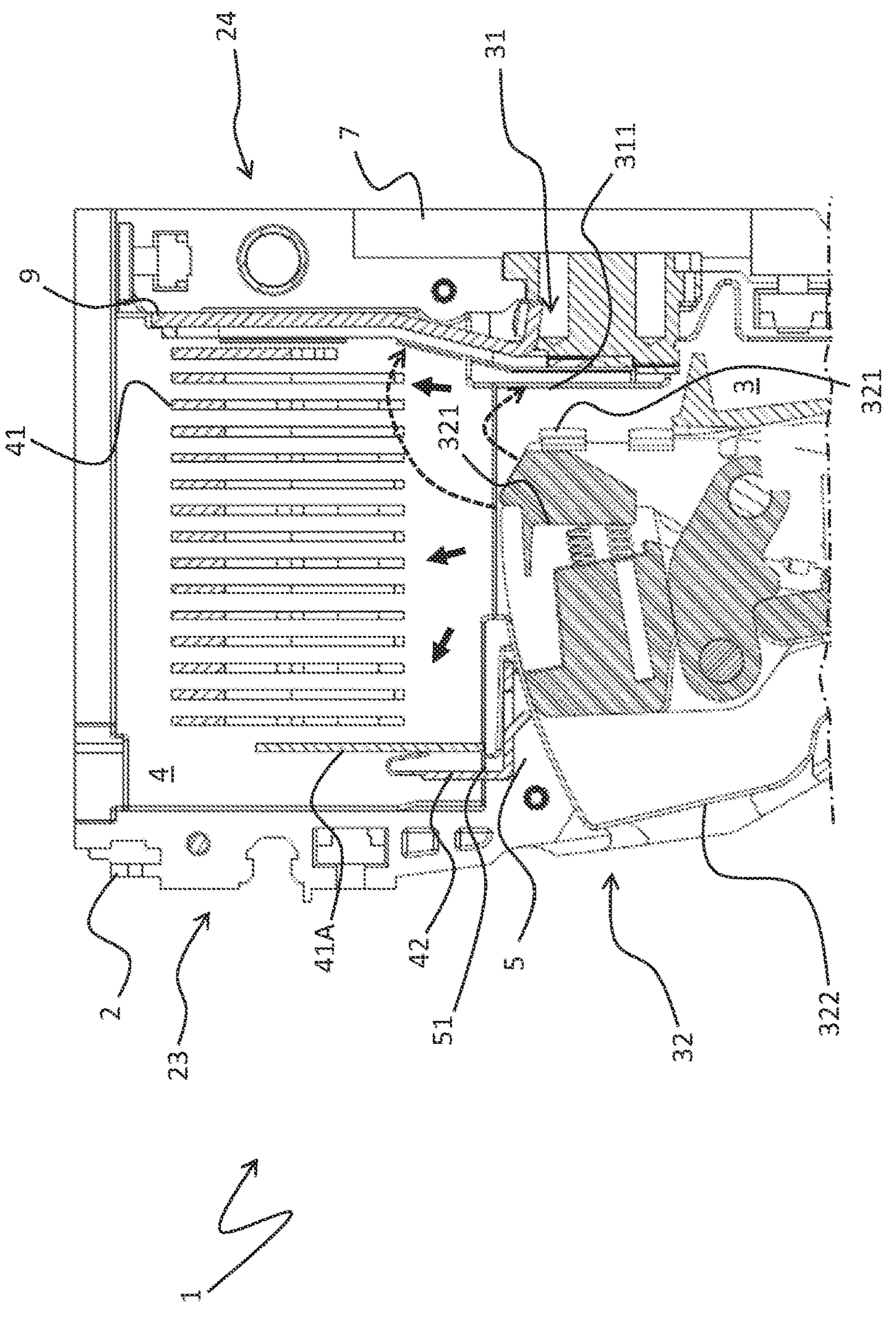

The high energy ionization effects of the air (dielectric medium) between the electric contacts 311, 321 leads to the generation of high-pressure hot gases, which cross the arc-extinguishing area 4 mainly moving towards the top wall 25 (the path of the hot gases at this stage of the opening maneuver is schematically represented by the solid arrows of FIG. 8).

As soon as the movable contacts 321 are sufficiently separated from the fixed contacts 311 (FIG. 9), electric arcs are caught by the additional arc-breaking element 42.

The additional arc-breaking element 42 has the terminal edge 421A and the protruding tab 421D of the first portion 421, which are located in proximity of contact area 3, so that the movable contacts 321 pass at a very short distance from these latter, while moving away from the fixed contacts 311. Electric arcs are thus forced to pass through the first and second plate portions 421, 422 of the additional arc-breaking element 42.

Figure 9:
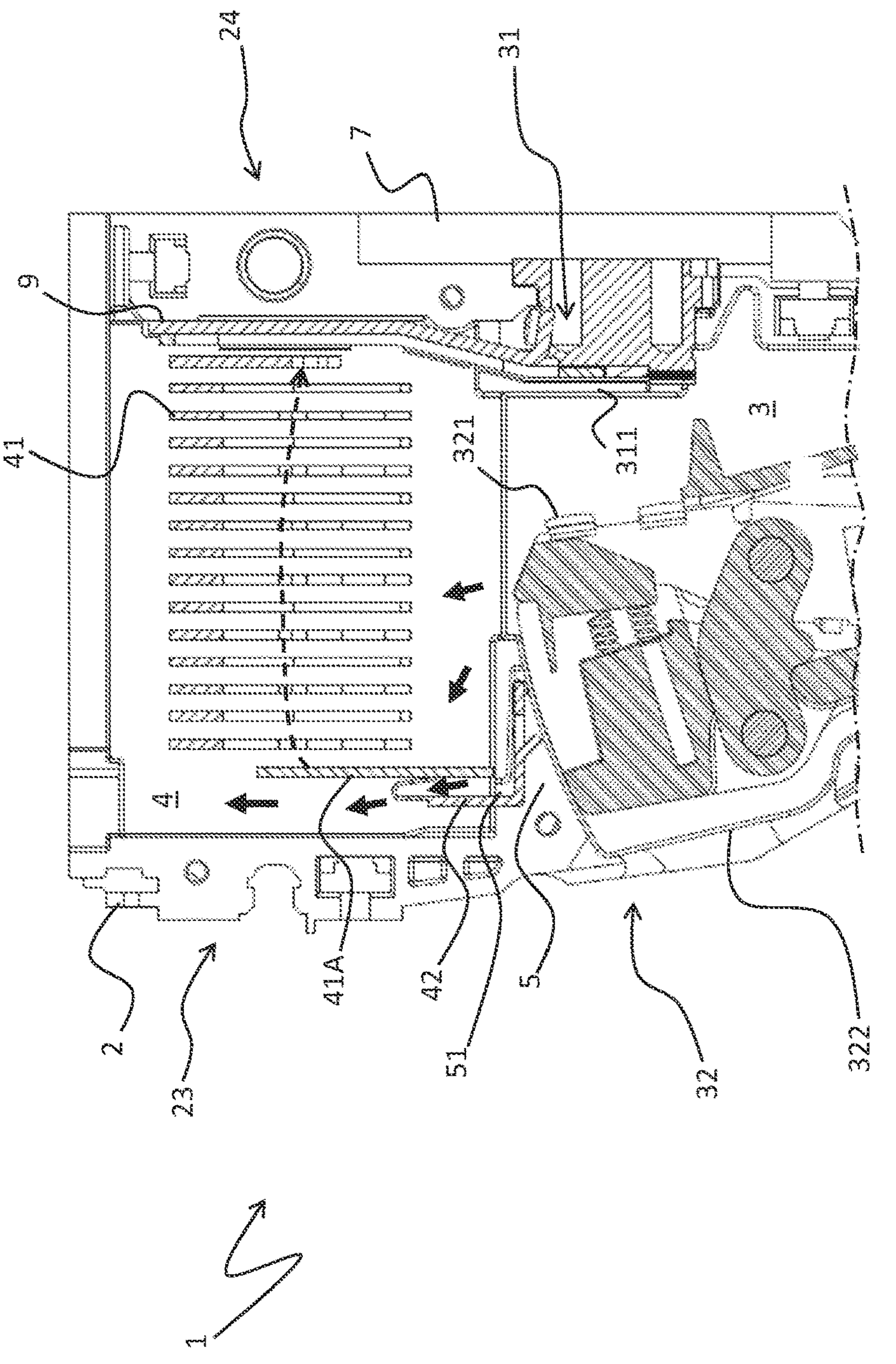

As the second plate portion 422 of the additional arc-breaking element 42 is in electrical contact with the terminal arc-breaking plate 41A, electric arcs are forced to pass through this latter and, subsequently, through the other arc-breaking plates 41 and the conductive plate 9 in order to go from the movable contacts 321 to the fixed contacts 311 (the path of the electric arcs at this stage of the opening maneuver is schematically represented by the dotted arrow of FIG. 9).

At the same time, thanks to the channel 51 of the insulating wall 5, hot gases are progressively conveyed to the front wall 23 and, subsequently, to the top wall 25 of the insulating casing 2, which additionally favors the stripping the electric arcs towards the additional arc-breaking element 42 (the path of the hot gases at this stage of the opening maneuver is schematically represented by the solid arrows of FIG. 9).

Finally, when the movable contacts 321 reach a position corresponding to an open condition of the switching device, electric arcs are finally quenched (FIG. 10) and the flow of electric current through the electric pole is finally interrupted.

As it is clear from the above description, the technical solutions adopted for the low voltage switch pole, according to the present disclosure, allow the proposed aims to be fully achieved.

Thanks to the arrangement of the additional terminal arc-breaking element, in the switch pole, according to the present disclosure, it is possible to obtain an optimal utilization of the arc-breaking plates of the arc chamber, which are progressively interested by the arcing phenomena during an opening maneuver of the switching device.

In particular, substantially all arc breaking plates are involved in the quenching action of electric arcs, thereby allowing a more uniform utilization of the arc chamber. Less mechanical and thermal stresses are therefore generated into the arc chamber with a consequent prolonged lifetime of this latter.

At the same time, thanks to the channel provided in the insulating wall of the switch pole, the fluid of the hot gases through the switch pole is greatly improved, thus further contributing to stripping the electric arcs throughout the arc chamber and improving the cooling of the movable contacts of the switch pole.

It is evidenced how the particular shape of the folded end of the arc-breaking element allows constantly maintaining an electrical contact between the additional arc-breaking element and the terminal arc-breaking plate of the arc chamber during the opening maneuver of the switching device, despite of the mechanical stresses generated by the high pressure of hot gases. Electrodynamics forces due to the passage of electric arcs through the additional arc-breaking element are directed in such a way to push its folded end on the terminal arc-breaking element.

Thanks to the insulating wall at boundary between the contact area and the arc-extinguishing area, the possibility for electric arcs to strike towards other conductive components of the switch pole, outside the arc-extinguishing area, is substantially avoided or greatly reduced.

As mentioned above, the present disclosure relates also to a low voltage switching device 100 including at least one low voltage switch pole 1 as previously described.

With reference to FIGS. 1 and 2, a three-pole low voltage circuit breaker 100 including three low voltage switch poles 1 (i.e., circuit breaker poles) is shown. In this embodiment, the insulating casing 2 of each switch pole 1 is made of two half shells, and the poles 1 are positioned side by side in a supporting a containing structure having rigid flanks 102, as well as a cover 101. From suitable windows in the front wall 23 of the insulating casing 2 of each switch pole 1, connecting elements 323 protrude outside for connection with a driving mechanism (not shown). The general structure of such low voltage circuit breaker 100 is, in general, well known in the art and therefore it will be not described in more details, for the sake of brevity.

The invention claimed is:

1. A switch pole for a low voltage switching device, the switch pole comprising:

an insulating casing defining an internal space with a contact area and an arc-extinguishing area of said switch pole;

a fixed contact assembly and a movable contact assembly positioned in said contact area and including, respectively, one or more fixed contacts and one or more movable contacts, which can be mutually coupled or uncoupled; and an arc chamber positioned in said arc-extinguishing area and comprising a plurality of arc-breaking plates, wherein said insulating casing comprises an insulating wall partially separating said contact area from said arc-extinguishing area, said insulating wall arranged in said internal space in an opposite position relative to said fixed contact assembly and extending from an outer wall of said insulating casing towards said fixed contact assembly, wherein said insulating wall includes a channel passing through said insulating wall and connecting said contact area to said arc-extinguishing area, and wherein said switch pole comprises an additional arc-breaking element anchored to said insulating wall and partially inserted in said channel, said additional arc-breaking element in electrical connection with a terminal arc-breaking plate arranged in a distal position from said fixed contact assembly as compared to other arc-breaking plates of said arc chamber.

2. The switch pole according to claim 1, wherein said additional arc-breaking element comprises a first plate portion inserted in said channel and extending along said insulating wall.

3. The switch pole according to claim 2, wherein said first plate portion comprises a terminal edge exposed to said contact area.

4. The switch pole according to claim 2, wherein said first plate portion comprises an opening for passage of hot gases through said channel.

5. The switch pole according to claim 2, wherein said first plate portion has a protruding tab oriented towards said contact area and exposed to said contact area.

6. The switch pole according to claim 2, wherein said first plate portion has a pair of side protrusions fitting to corresponding anchoring surfaces of said channel.

7. The switch pole according to claim 1, wherein said additional arc-breaking element comprises a second plate portion passing through said channel, protruding from said insulating wall, and extending across said arc-extinguishing area.

8. The switch pole according to claim 7, wherein said second plate portion comprises a folded end coupled to said terminal arc-breaking plate.

9. The switch pole according to claim 8, wherein said folded end has a reversed-U profile.

10. The switch pole according to claim 1, wherein said insulating casing has opposite front and rear walls, said terminal arc-breaking plate arranged at said front wall, and said fixed contact assembly arranged at said rear wall.

11. The switch pole according to claim 1, wherein said terminal arc-breaking plate is arranged in a proximal position to said contact area as compared to the other arc-breaking plates of said arc chamber.

12. The switch pole according to claim 1, wherein said arc chamber comprises an insulating enclosure that can be removably fixed to said insulating casing, said arc-breaking plates fixed to said insulating enclosure.

13. The switch pole according to claim 1, wherein said insulating wall is integral with a front wall and opposite side walls of said insulating casing and extends from said front wall towards said fixed contact assembly.

14. A low voltage switching device comprising the switch pole according to claim 1.

15. The switch pole according to claim 3, wherein said first plate portion further comprises an opening for passage of hot gases through said channel.

16. The switch pole according to claim 3, wherein said first plate portion further comprises a protruding tab oriented towards said contact area and exposed to said contact area.

17. The switch pole according to claim 4, wherein said first plate portion further comprises a protruding tab oriented towards said contact area and exposed to said contact area.

18. The switch pole according to claim 3, wherein said first plate portion further comprises a pair of side protrusions fitting to corresponding anchoring surfaces of said channel.

19. The switch pole according to claim 4, wherein said first plate portion further comprises a pair of side protrusions fitting to corresponding anchoring surfaces of said channel.

20. The switch pole according to claim 5, wherein said first plate portion further comprises a pair of side protrusions fitting to corresponding anchoring surfaces of said channel.

* * * * *